US012671448B2

(12) United States Patent
Woo

(10) Patent No.: US 12,671,448 B2
(45) Date of Patent: Jun. 30, 2026

(54) MULTI-BAND MULTI-PATH INTERCONNECTIONS

(71) Applicant: Apple Inc., Cupertino, CA (US)

(72) Inventor: Sang Hyun Woo, Austin, TX (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 18/229,069

(22) Filed: Aug. 1, 2023

(65) Prior Publication Data

US 2025/0047312 A1 Feb. 6, 2025

(51) Int. Cl.
*H04B 1/00* (2006.01)

(52) U.S. Cl.
CPC ........... *H04B 1/0078* (2013.01); *H04B 1/006* (2013.01)

(58) Field of Classification Search
CPC ... H04B 1/02; H04B 1/04; H04B 1/16; H04B 1/0078; H04B 1/006; H04B 1/40; H04B 1/401
See application file for complete search history.

(56) References Cited

U.S. PATENT DOCUMENTS 4,189,676 A * 2/1980 Arias ................... H04B 1/0458
455/116
8,384,494 B2 2/2013 Laporte

| | | |
|---|---|---|
| 9,362,621 B1 | 6/2016 | He |
| 10,109,999 B2 * | 10/2018 | Walker ...................... H03F 1/56 |
| 10,608,323 B2 | 3/2020 | Choi |
| 11,095,021 B2 | 8/2021 | Sung |
| 11,411,596 B1 | 8/2022 | Lin |
| 2014/0009209 A1 | 1/2014 | Cebi |
| 2014/0206301 A1 | 7/2014 | Mohan et al. |
| 2014/0287699 A1 | 9/2014 | Lin et al. |
| 2017/0019140 A1 | 1/2017 | Morteza et al. |
| 2020/0176869 A1 | 6/2020 | Huang |
| 2023/0231580 A1 | 7/2023 | Yang et al. |

OTHER PUBLICATIONS

Extended European Search Report for European Patent Application No. 24186178.0 dated Jan. 9, 2025; 7 pgs.

* cited by examiner

*Primary Examiner* — Tuan Pham
(74) *Attorney, Agent, or Firm* — FLETCHER YODER PC

(57) ABSTRACT

An electronic device includes a first interconnection between a first circuitry and a second circuitry that does not include a switch. A second interconnection may couple or connect third circuitry to the first interconnection via a first switch. Signals sent from the first circuitry to the second circuitry may have a higher priority and/or a different frequency than those sent from the third circuitry to the second circuitry. The first switch may be disposed near a first junction of the first interconnection and the second interconnection. In some embodiments, a ground or a termination resistance may also be coupled to the first interconnection via a second switch. The second switch may be coupled to the first interconnection at a second junction near the first circuitry.

20 Claims, 9 Drawing Sheets

MULTI-BAND MULTI-PATH INTERCONNECTIONS

BACKGROUND

The present disclosure relates generally to wireless communication, and more specifically to interconnections or routings in and/or between integrated circuits used to perform or facilitate wireless communication.

Communication circuitry, such as radio frequency and/or millimeter wave (mmWave) frequency communication circuitry, may include many interconnections or routings to communicatively couple functional blocks (e.g., circuitry and/or components) within an integrated circuit or chip (or between integrated circuits or chips). These interconnections may support multiple and/or different frequencies (e.g., multiple and/or different frequency bands) and may have different performance priority. That is, interconnections for communications using some frequencies or frequency bands may be of a different (e.g., higher or lower) priority than interconnections for communications using other frequencies or frequency bands. Switches may be used to communicatively couple different functional blocks via different interconnections when desired. However, the switches may result in undesirable loss and/or performance degradation to signals in the interconnections.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, radio frequency circuitry includes first circuitry, second circuitry, a first interconnection coupling the first circuitry to the second circuitry, third circuitry, and a second interconnection coupling the third circuitry to the first interconnection via a first switch. The first interconnection is continuous.

In another embodiment, tangible, non-transitory, computer-readable media stores instructions that cause processing circuitry to receive an indication of a frequency of a signal to be sent from a first circuitry to a second circuitry over a first interconnection or a third circuitry to the second circuitry over a second interconnection and the first interconnection, deactivate a first switch coupling the third circuitry to the first interconnection and deactivate a second switch coupling a third interconnection to the first interconnection based on the frequency being associated with a priority, and activate the first switch and activate the second switch based on the frequency not being associated with the priority.

In yet another embodiment, an electronic device includes one or more antennas and a transceiver coupled to the one or more antennas. The transceiver includes first circuitry, second circuitry, a first interconnection coupling the first circuitry to the second circuitry, third circuitry, and a second interconnection coupling the third circuitry to the first interconnection via a first switch. The first interconnection sends a first signal of a first frequency from the first circuitry to the second circuitry and the second interconnection sends a second signal of a second frequency from the third circuitry to the second circuitry.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figures 1, 2:
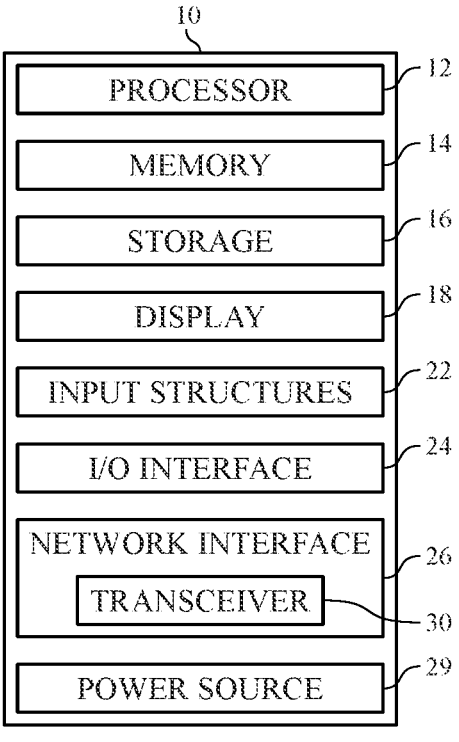
FIG. 1 is a block diagram of an electronic device, according to embodiments of the present disclosure.
FIG. 2 is a functional diagram of the electronic device of FIG. 1, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to interconnections or routings in and/or between integrated circuits used to perform or facilitate communication. The interconnections may support multiple and/or different frequencies (e.g., multiple and/or different frequency bands) and may have different performance priority. For example, a first interconnection coupling first and second circuitries may communicate (e.g., transmit) signals of a first frequency that may be higher priority than a second interconnection coupling the first interconnection and a third circuitry at a junction that communicates (e.g., transmit) signals of a second frequency. The first, second, and third circuitries may include any circuitries or functional blocks used to facilitate radio frequency operation, such as radio frequency front end components (e.g., digital-to-analog converters (DACs), analog-to-digital converters (ADCs), filters, mixers, and so on). While the present disclosure may refer to application of the disclosed embodiments to wireless communication systems, it should be understood that they may also apply to wired communication systems, particularly in cases in which operating frequency or data rate is sufficiently high (e.g., greater than 1 gigahertz (GHz), greater than 2 GHz, greater than 3 GHz, and so on), such as in the case of transmission line theory. Accordingly, it may be desired for the first interconnection to have better performance than the second interconnection.

Switching circuitry may be used to couple the first circuitry to the second circuitry or the third circuitry, thus employing the first interconnection or the second interconnection. For example, when it is desired to send a high priority signal between the first circuitry and the second circuitry, a first switch on the first interconnection may be activated or turned on to couple the first circuitry to the second circuitry, while a second switch on the second interconnection may be deactivated or turned off to uncouple the third circuitry from the first interconnection. In some embodiments, the first interconnection may be greater in length than the second interconnection. Moreover, the first switch may be disposed nearer to the junction of the first and second interconnections than to the first circuitry. For example, the first switch may be disposed within a threshold distance from the junction, and the second switch may be disposed within a threshold distance to the first junction. As such, when the second switch is deactivated, loading from the second switch is reduced or minimized, thus providing a high or maximum non-operating path impedance that blocks signals from the third circuitry from passing to the first interconnection, and thus the second circuitry. When it is desired to send a low priority signal over the second interconnection, the second switch on the second interconnection may be activated to couple the third circuitry to the first interconnection, and thus the second circuitry, while the first switch on the first interconnection may be deactivated to uncouple the first circuitry from the second circuitry. However, when sending the high priority signal over the first interconnection, the activated first switch may nevertheless provide a low or minimum operating path impedance that causes a nonzero power loss in the high priority signal (though less than if the first switch were deactivated).

Embodiments herein provide various interconnections or routings (e.g., between or within integrated circuits or chips) that reduce power loss in signals. To do so, the embodiments disclosed herein include a first interconnection between a first circuitry (e.g., a first source circuitry) and a second circuitry (e.g., a destination circuitry) that does not include a switch. As such, the first interconnection may directly couple or connect (e.g., without any intervening or intermediate components) the first circuitry and the second circuitry. A second interconnection may couple or connect third circuitry (e.g., a second source circuitry) to the first interconnection, and thus the second circuitry, via a first switch. Signals sent from the first circuitry to the second circuitry may have a higher priority and/or a different frequency than those sent from the third circuitry to the second circuitry. The first switch may be disposed near a first junction of the first interconnection and the second interconnection (e.g., within a threshold distance from the first junction). Moreover, the first junction may be disposed near the second circuitry (e.g., within a threshold distance to the second circuitry).

In some embodiments, the first junction may be located near the first circuitry (e.g., within a threshold distance to the first circuitry). When it is desired to send a high priority signal between the first circuitry and the second circuitry, the first switch may be deactivated or turned off to uncouple the third circuitry from the first interconnection, and the first circuitry may be activated or turned on. The lack of switch on the first interconnection may reduce or minimize loss for high priority signals sent from the first circuitry to the second circuitry, while the deactivated first switch may provide high impedance on the non-operating path (of the second interconnection). When it is desired to send a low priority signal between the second circuitry and the third circuitry, the first switch may be activated or turned on to couple the third circuitry to the first interconnection, and first circuitry may be deactivated or turned off, providing a high impedance. Because the first junction is located near the first circuitry, reflection of the low priority signal from the high impedance of the first circuitry may be reduced or minimized.

In additional or alternative embodiments, a ground may also be coupled to the first interconnection via a second switch. The second switch may be coupled to the first interconnection at a second junction a quarter lambda length away from the first junction, where the quarter lambda length is a quotient of a speed of a wave of the signal traveling in the first interconnection (e.g., speed of light) divided by a frequency of the signal. The second switch may be disposed near the second junction (e.g., within a threshold distance to the second junction). When it is desired to send a high priority signal between the first circuitry and the second circuitry, the first switch may be deactivated or turned off to uncouple the third circuitry from the first interconnection, and the second switch may be deactivated or turned off to uncouple the ground from the first interconnection. The lack of switch on the first interconnection may reduce or minimize loss for high priority signals sent from the first circuitry to the second circuitry, while the deactivated first switch may provide high impedance on the non-operating path (of the second interconnection) and the deactivated second switch may provide high impedance near the ground, thus at least partially blocking the high priority signal from travelling to the second circuitry and/or the ground. When it is desired to send a low priority signal between the second circuitry and the third circuitry, the first switch may be activated or turned on to couple the third circuitry to the first interconnection, and the second switch may be activated or turned on to couple the ground to the first interconnection. As such, the second switch and the ground may provide low impedance at the second junction a quarter lambda length away from the first junction, resulting in providing high impedance at the first junction, thus at least partially blocking the low priority signal from travelling to the first circuitry and/or the ground.

In some embodiments, a termination resistance may be coupled to the first interconnection via a second switch. The second switch may be coupled to the first interconnection at a second junction near the first circuitry (e.g., within a threshold distance to the first junction). When it is desired to send a high priority signal between the first circuitry and the second circuitry, the first switch may be deactivated or turned off to uncouple the third circuitry from the first interconnection, the second switch may be deactivated or turned off to uncouple the termination resistance from the first interconnection, and the first circuitry may be activated or turned on. The lack of switch on the first interconnection may reduce or minimize loss for high priority signals sent from the first circuitry to the second circuitry, while the deactivated first switch may provide high impedance on the non-operating path (of the second interconnection) and the deactivated second switch may provide high impedance near the termination resistance, thus at least partially blocking the high priority signal from travelling to the second circuitry or the termination resistance. When it is desired to send a low priority signal between the second circuitry and the third circuitry, the first switch may be activated or turned on to couple the third circuitry to the first interconnection, the second switch may be activated or turned on to couple the termination resistance to the first interconnection, and the first circuitry may be deactivated or turned off, providing a high impedance. The low priority signal may split from the third circuitry at the first junction in a first portion that travels to the second circuitry and a second portion that travels toward the high impedance of the deactivated first circuitry. However, because the second switch is activated, the second portion may not reflect from the high impedance of the deactivated first circuitry and instead travel to and be absorbed by the termination resistance, thus reducing or minimizing reflection of the low priority signal.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer, a portable electronic or handheld electronic device such as a wireless electronic device or smartphone, a tablet, a wearable electronic device, and other similar devices. In additional or alternative embodiments, the electronic device 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution® (LTE) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multibeam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figures 3, 4:
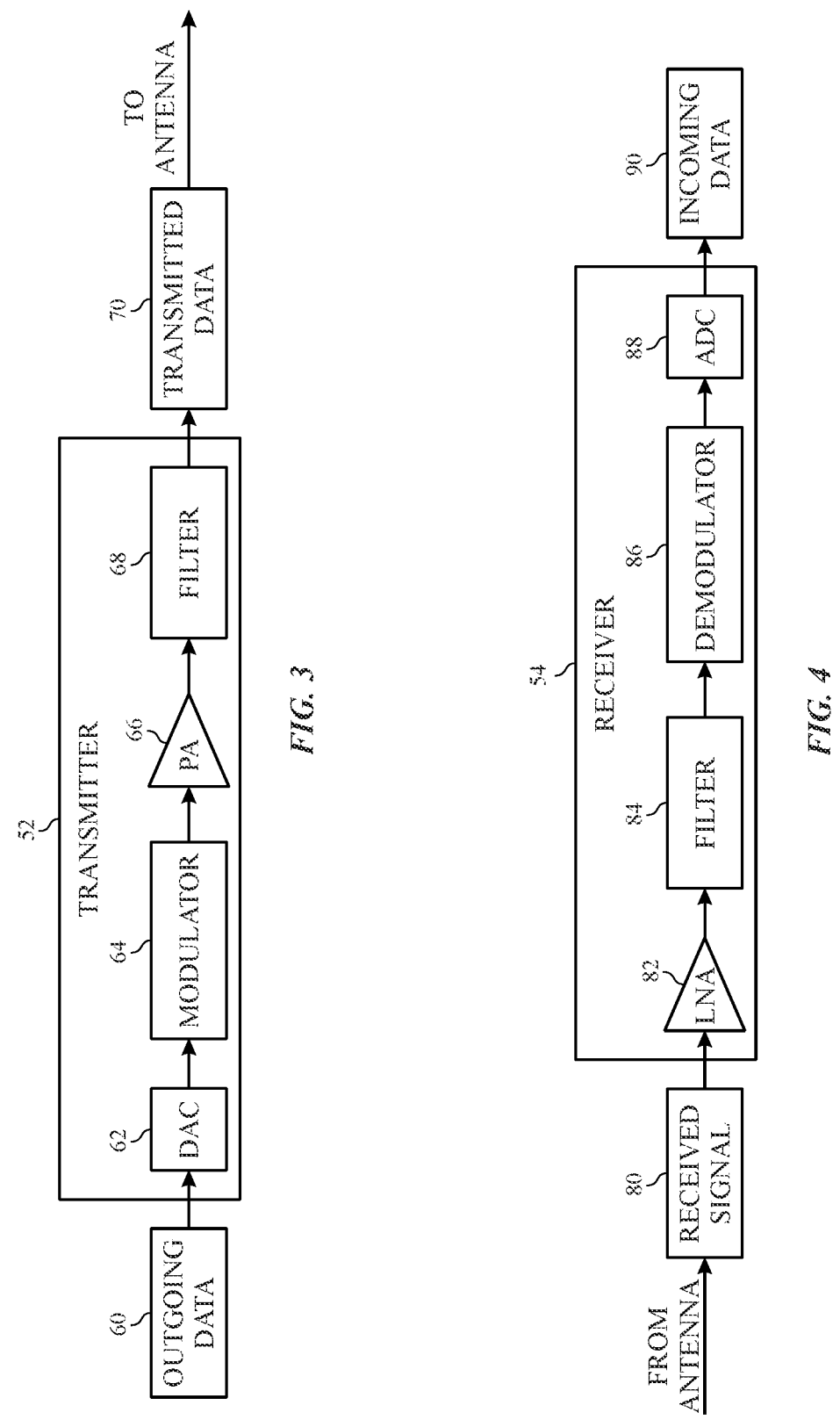
FIG. 3 is a schematic diagram of a transmitter of the electronic device of FIG. 1, according to embodiments of the present disclosure.
FIG. 4 is a schematic diagram of a receiver of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE, and more specifically, a receiver front end (RXFE) of the electronic device 10.

A demodulator 86 may remove a radio frequency carrier signal and/or extract a demodulated signal (e.g., an envelope signal) from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

The electronic device 10, including the transceiver 30, the transmitter 52, the receiver 54, and/or the RFFE, may include interconnections or routings in and/or between integrated circuits used to perform or facilitate wireless communication. The interconnections may support multiple and/or different frequencies (e.g., multiple and/or different frequency bands) and may have different performance priority. For example, a first interconnection coupling first and second circuitries may communicate signals of a first frequency that may be higher priority than a second interconnection coupling the first interconnection and a third circuitry at a junction that communicates signals of a second frequency. The first, second, and third circuitries may include any circuitries or functional blocks used to facilitate radio frequency operation, such as RFFE components. These circuitries may include any components discussed above that make up the transceiver 30, the transmitter 52, and/or the receiver 54, as well as any other components that may facilitate wireless communication (e.g., amplifiers, power amplifiers, low noise amplifiers, DACs, ADCs, filters, mixers, digital up converters, digital down converters, modulators, demodulators, and so on). In particular, the circuitries may send or receive radio frequency signals (e.g., having frequencies between 3 kilohertz (kHz) and 300 GHz) between themselves over the interconnections. Accordingly, it may be desired for the first interconnection to have better performance than the second interconnection. In some cases, the first interconnection may transfer signals having frequencies in one frequency band (e.g., in a 4G frequency band between 600 MHz and 2500 MHz, in a 5G frequency band between 450 MHz and 52.6 GHz, in a mmWave frequency range, and so on), while the second interconnection may transfer signals having frequencies in another frequency band. In other cases, the first and second interconnections may transfer signals having frequencies in the same frequency band.

Switching circuitry may be used to couple the first circuitry to the second circuitry or the third circuitry, thus employing the first interconnection or the second interconnection. For example, when it is desired to send a high priority signal between the first circuitry and the second circuitry, a first switch on the first interconnection may be activated or turned on to couple the first circuitry to the second circuitry, while a second switch on the second interconnection may be deactivated or turned off to uncouple the third circuitry from the first interconnection. In some embodiments, the first interconnection may be greater in length than the second interconnection. Moreover, the first switch may be disposed nearer to the junction of the first and second interconnections than to the first circuitry. For example, the first switch may be disposed within a threshold distance from the junction, and the second switch may be disposed within a threshold distance to the first junction. As such, when the second switch is deactivated, loading from the second switch is reduced or minimized, thus providing a high or maximum non-operating path impedance that blocks signals from the third circuitry from passing to the first interconnection, and thus the second circuitry. When it is desired to send a low priority signal over the second interconnection, the second switch on the second interconnection may be activated to couple the third circuitry to the first interconnection, and thus the second circuitry, while the first switch on the first interconnection may be deactivated to uncouple the first circuitry from the second circuitry. However, when sending the high priority signal over the first interconnection, the activated first switch may nevertheless provide a low or minimum operating path impedance that causes a nonzero power loss in the high priority signal (though less than if the first switch were deactivated).

Embodiments herein provide various interconnections or routings (e.g., between or within integrated circuits or chips) that reduce power loss in signals. To do so, the embodiments disclosed herein include a first interconnection between a first circuitry (e.g., a first source circuitry) and a second circuitry (e.g., a destination circuitry) that does not include a switch. As such, the first interconnection may directly couple or connect (e.g., without any intervening or intermediate components) the first circuitry and the second circuitry. A second interconnection may couple or connect third circuitry (e.g., a second source circuitry) to the first interconnection, and thus the second circuitry, via a first switch. Signals sent from the first circuitry to the second circuitry may have a higher priority and/or a different frequency than those sent from the third circuitry to the second circuitry. The first switch may be disposed near a first junction of the first interconnection and the second interconnection (e.g., within a threshold distance from the first junction). Moreover, the first junction may be disposed near the second circuitry (e.g., within a threshold distance to the second circuitry).

Figure 5A:
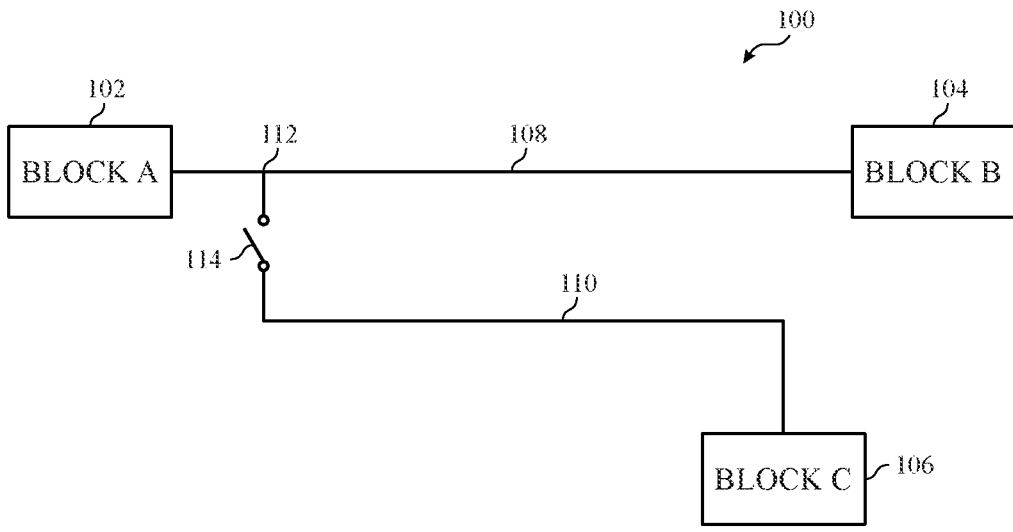
FIG. 5A is a schematic diagram of radio frequency (RF) circuitry of the electronic device of FIG. 1 having a first circuitry, a second circuitry, a third circuitry, a first interconnection coupling the first circuitry and the second circuitry, a second interconnection coupling the third circuitry and the first interconnection at a junction, wherein the junction is located near the first circuitry, according to embodiments of the present disclosure.

FIG. 5A is a schematic diagram of radio frequency (RF) circuitry 100 of the electronic device 10 having a first circuitry 102 (e.g., a first source circuitry "Block A"), a second circuitry 104 (e.g., a destination circuitry "Block B"), a third circuitry 106 (e.g., a second source circuitry "Block C"), a first interconnection 108 coupling the first circuitry 102 and the second circuitry 104, a second interconnection 110 coupling the third circuitry 106 and the first interconnection 108 at a first junction 112, wherein the first junction 112 is located near the first circuitry 102, according to embodiments of the present disclosure. The interconnections 108, 110 may include any suitable components that communicatively circuitries of the electronic device 10, such as routings, routing paths, wires, conduits, metal traces, cables, and so on, and may include single-ended or differential interconnections. Additionally, the first junction 112 may be located within a threshold distance to the first circuitry 102, such as within one or more centimeters (cm), within one or more millimeters (mm), within one or more micrometers (um), within one or more nanometers (nm), and so on, of the first circuitry 102. In some embodiments, the first junction 112 may be within 20% or less, 10% or less, 5% or less, 2% or less, 1% or less, and so on, of a length of the first interconnection 108 from the first circuitry 102. This is to reduce or minimize reflection of a signal sent from the third circuitry 106 off the first circuitry 102 when the first circuitry is providing a high impedance, such as when the first circuitry 102 is deactivated or turned off.

A first switch 114 may be disposed on the second interconnection 110 to switch operation modes of the RF circuitry 100, for example, to switch between a first mode of operation where a signal (e.g., having a first priority level or high priority level) is sent from the first circuitry 102 to the second circuitry 104 over the first interconnection 108, and a second mode of operation where a signal (e.g., having a second priority level or low priority level) is sent from the third circuitry 106 to the second circuitry 104 over the second interconnection 110 and the first interconnection 108. A signal may be characterized as a high priority signal that is sent on the switchless first interconnection 108 to reduce or minimize power loss (e.g., may be caused if a switch were disposed on the first interconnection 108). As such, the first interconnection 108 may be referred to as a direct, uninterrupted, continuous, sustained, solid, and/or monolithic interconnection or coupling between the first circuitry 102 and the second circuitry 104, as there are no intervening or intermediate components between the first interconnection 108 and the first circuitry 102 and the second circuitry 104.

The signal may be high priority in that the processor 12 may determine or identify the signal (or the first circuitry 102 as the entity or source sending the signal) as higher priority than, for example, the low priority signal being sent from the third circuitry 106. The signal may be low priority in that the processor 12 may determine or identify the signal (or the third circuitry 106 as the entity or source sending the signal) as lower priority than, for example, the high priority signal being sent from the first circuitry 102. For example, the high priority signal may be associated with emergency services, voice calls, video streaming, user data, configuration data, messaging services, video game streaming, and so on. The low priority signal may be associated with background services, non-critical applications, configuration data, messaging services, video game streaming, and so on. The high priority signal may have a frequency that is associated with being high priority or that is within a frequency range associated with being high priority (e.g., as identified or designated by the processor 12), while the low priority signal may have a frequency that is associated with being low priority or that is within a frequency range associated with being low priority (e.g., as identified or designated by the processor 12).

The first switch 114 may be disposed near the first junction 112 to reduce or minimize the high priority signal (e.g., when operating in the first mode of operation) splitting from the first interconnection 108 and traveling down the second interconnection 110. For example, the first switch 114 may be located within a threshold distance to the first junction 112, such as within one or more cm, within one or more mm, within one or more um, within one or more nm, and so on, of the first junction 112. In some embodiments, the first switch 114 may be disposed within 20% or less, 10% or less, 5% or less, 2% or less, 1% or less, and so on, of a length of the second interconnection 110 from the first junction 112.

Figure 5B:
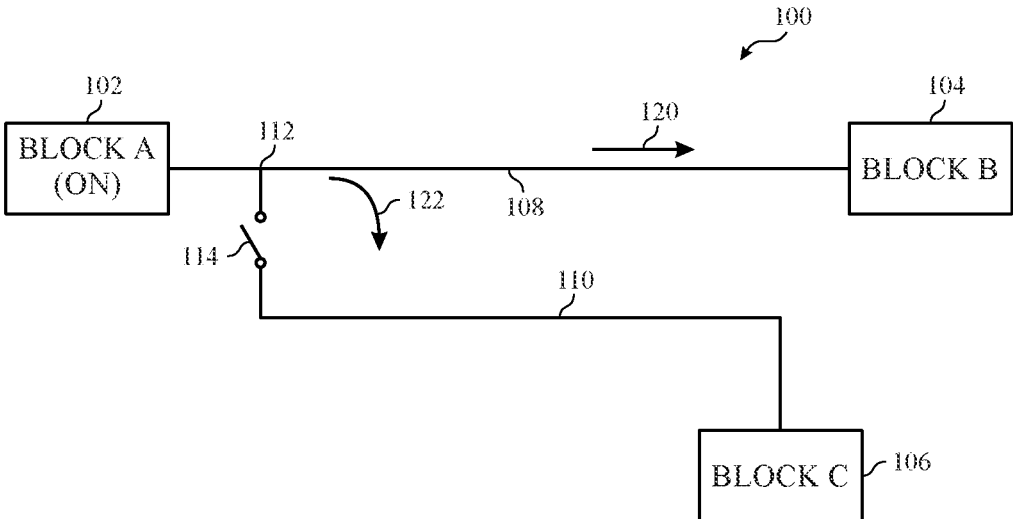
FIG. 5B is a schematic diagram of the RF circuitry of FIG. 5A operating in a first mode to send a high priority signal from the first circuitry to the second circuitry, according to embodiments of the present disclosure.

FIG. 5B is a schematic diagram of the RF circuitry 100 operating in the first mode to send a high priority signal 120 from the first circuitry 102 to the second circuitry 104, according to embodiments of the present disclosure. As illustrated, in the first mode of operation, the processor 12 may deactivate or turn off the first switch 114. The processor 12 may also activate or turn on the first circuitry 102 to enable the first circuitry 102 to send the high priority signal 120. It should be understood that activating the first circuitry 102 may include powering on the first circuitry 102, supplying power to the first circuitry 102, or activating switching circuitry that couples the first circuitry to the first interconnection 108. In this manner, the high priority signal 120 may travel from the first circuitry 102 to the second circuitry 104 over the first interconnection 108 with reduced or minimized power loss due to a lack of switching circuitry being disposed on the first interconnection 108. Additionally, because the first switch 114 is deactivated and disposed near the first junction 112, it provides a high impedance 122 at the first switch 114 near the first junction 112, reducing or minimizing a path on the second interconnection 110 for the high priority signal 120 to travel, blocking or preventing the high priority signal 120 from reaching the third circuitry 106. The high impedance 122 may be any suitable impedance that blocks or prevents the high priority signal 120 from passing through, such as 100 ohms or more, 150 ohms or more, 200 ohms or more, 300 ohms or more, 500 ohms or more, and so on.

Figure 5C:
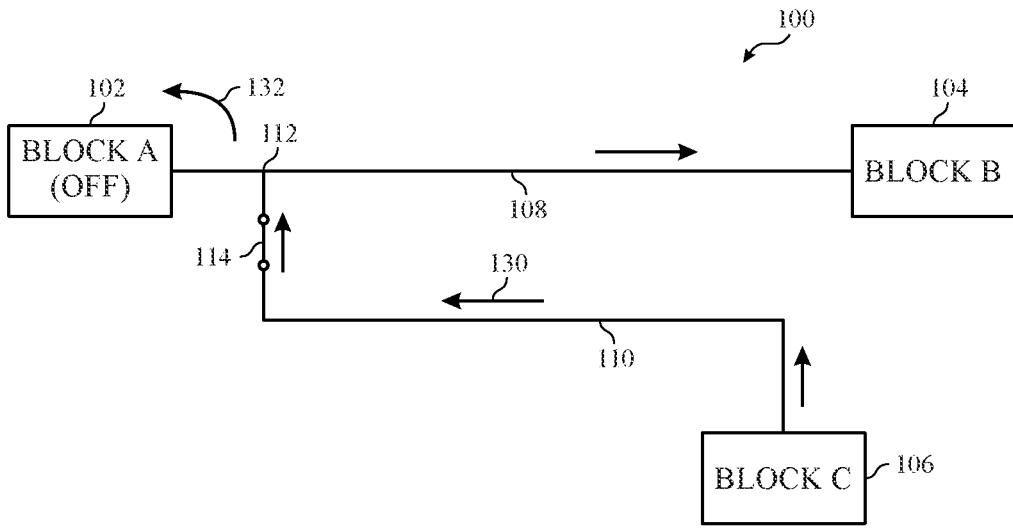
FIG. 5C is a schematic diagram of the RF circuitry of FIG. 5A operating in a second mode to send a low priority signal from the third circuitry to the second circuitry, according to embodiments of the present disclosure.

FIG. 5C is a schematic diagram of the RF circuitry 100 operating in the second mode to send a low priority signal 130 from the third circuitry 106 to the second circuitry 104, according to embodiments of the present disclosure. As illustrated, in the second mode of operation, the processor 12 may activate or turn on the first switch 114. The processor 12 may also deactivate or turn off the first circuitry 102, causing the first circuitry 102 to provide a high impedance. It should be understood that deactivating the first circuitry 102 may include powering off the first circuitry 102, uncoupling the first circuitry 102 from a power supply, or activating switching circuitry that couples the first circuitry to the first interconnection 108. In this manner, the low priority signal 130 may travel from the third circuitry 106 to the second circuitry 104 over the second interconnection 110 and the first interconnection 108. Because the first circuitry 102 is deactivated and disposed near the first junction 112, its high impedance 132 may reduce or minimize a reflection path on the first interconnection 108 for the low priority signal 130 to travel, thus reducing or minimizing any reflection of the low priority signal 130 to be received at the second circuitry 104.

Figure 6:
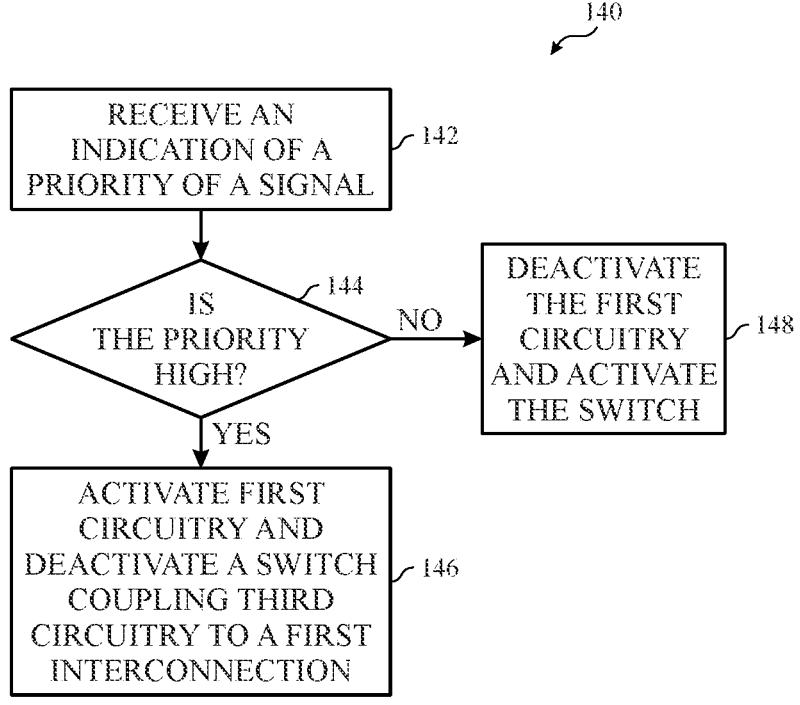
FIG. 6 is a flowchart of a method for operating the RF circuitry of FIG. 5A to send high priority signals and low priority signals to the second circuitry, according to embodiments of the present disclosure.

FIG. 6 is a flowchart of a method 140 for operating the RF circuitry 100 to send high priority signals (e.g., 120) and low priority signals (e.g., 130) to the second circuitry 104, according to embodiments of the present disclosure. Any suitable device (e.g., a controller) that may control components of the electronic device 10, such as the processor 12, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating system of the electronic device 10, one or more software applications of the electronic device 10, and the like. While the method 140 is described using steps in a specific sequence, it should be understood that the present disclosure contemplates that the described steps may be performed in different sequences than the sequence illustrated, and certain described steps may be skipped or not performed altogether.

In process block 142, the processor 12 receives an indication of a priority of a signal. In particular, the processor 12 may intend to send the signal from the first circuitry 102 or the third circuitry 106 to the second circuitry 104. In some embodiments, the processor 12 may receive an indication of a frequency of the signal, and determine whether the signal frequency is within a frequency range (e.g., frequency band) associated with high priority As such, the signal frequency may be within a 4G frequency band between 600 MHz and 2500 MHz, in a 5G frequency band between 450 MHz and 52.6 GHz, in an mmWave frequency range, and so on. The signal may be intended to be transmitted by the transmitter 52 or received by the receiver 54.

In process block 144, the processor 12 determines whether the priority is a high priority. In particular, the signal may be high priority in that the processor 12 may determine or identify the signal (or the first circuitry 102 as the entity sending the signal) as higher priority than, for example, the low priority signal being sent from the third circuitry 106. If the processor 12 determines that the priority is the high priority, then in process block 146, the processor 12 activates the first circuitry 102 and deactivates the first switch 114 to uncouple the third circuitry 106 from the first interconnection 108. This may provide a lossless path (e.g., via the first interconnection 108 without a switch) for the high priority signal to travel from the first circuitry 102 to the third circuitry 106, with the high impedance 122 of the deactivated switch 114 preventing the high priority signal from traveling to the third circuitry 106. On the other hand, if the processor 12 determines that the signal frequency is not associated with the high priority, then in process block 148, the processor 12 deactivates the first circuitry 102 and activates the first switch 114 to couple the third circuitry 106 to the first interconnection 108. This may provide a path (via the second interconnection 110 and the first interconnection 108) for the low priority signal to travel from the third circuitry 106 to the second circuitry 104 while reducing or minimizing reflection from the high impedance 132 of the deactivated first circuitry 102. In this manner, the method 140 enables the processor 12 to operate the RF circuitry 100 to send high priority signals (e.g., 120) and low priority signals (e.g., 130) to the second circuitry 104.

In cases where the first circuitry 102 and the third circuitry 106 are disposed further from one another (e.g., greater than 1 nm, greater than 1 um, greater than 1 mm, greater than 1 cm, and so on), excessive routing may be used for the second interconnection 110, since the first switch 114 and/or the first junction 112 may be disposed near the first circuitry 102 to reduce or minimize reflection of the low priority signal 130. An excessively long second interconnection 110 may result in excessive layout or integrated circuit area consumption.

Figure 7A:
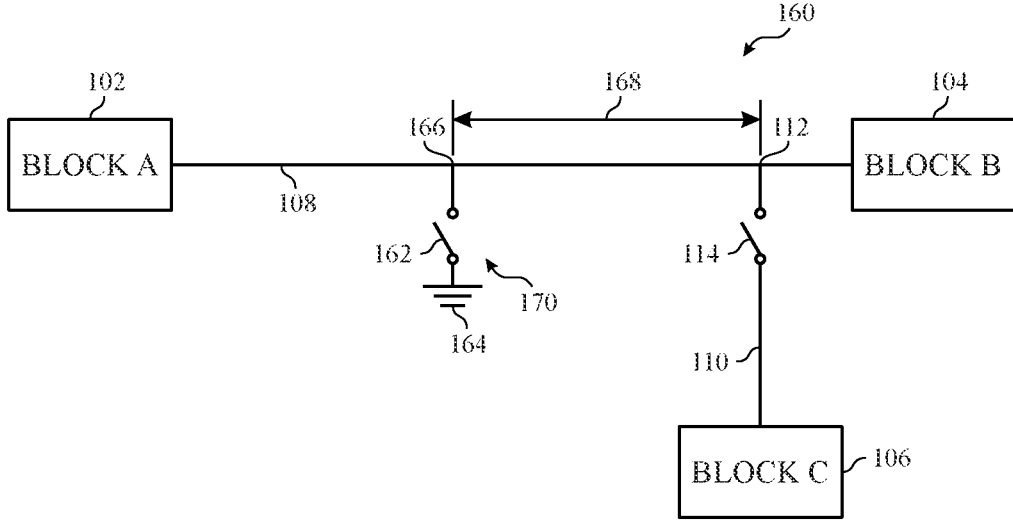
FIG. 7A is a schematic diagram of RF circuitry of the electronic device of FIG. 1 having the first circuitry, the second circuitry, the third circuitry, the first interconnection coupling the first circuitry and the second circuitry, the second interconnection coupling the third circuitry and the first interconnection at a first junction, wherein the first junction is located near the second circuitry, and a second switch coupled to a ground the first interconnection at a second junction a quarter lambda length away from the first junction, according to embodiments of the present disclosure.

FIG. 7A is a schematic diagram of RF circuitry 160 of the electronic device 10 having the first circuitry 102, the second circuitry 104, the third circuitry 106, the first interconnection 108 coupling the first circuitry 102 and the second circuitry 104, the second interconnection 110 coupling the third circuitry 106 and the first interconnection 108 at the first junction 112, wherein the first junction 112 is located near the second circuitry 104, and a second switch 162 coupled to a ground 164 and the first interconnection 108 at a second junction 166 a quarter lambda length 168 away from the first junction 112, according to embodiments of the present disclosure. As illustrated, the RF circuitry 160 may avoid having the first switch 114 and/or the first junction 112 be disposed near the first circuitry 102, thus possibly avoiding an excessively long second interconnection 110.

The quarter lambda length 168 is a quotient of a speed of a wave of a signal (e.g., a low priority signal) traveling in the first interconnection 108 (e.g., speed of light) divided by a frequency of the signal. The quarter lambda length 168 may enable a low impedance provided by the second switch 162 and the ground 164 at the second junction 166 to result as a high impedance at the first junction 112 for a signal (e.g., a low priority signal) sent from the third circuitry 106 to the second circuitry 104, thus at least partially blocking the signal from travelling to the first circuitry 102 and/or the ground 164. The second switch 162 may be disposed near the second junction 166. For example, the second switch 162 may be located within a threshold distance to the second junction 166, such as within one or more cm, within one or more mm, within one or more um, within one or more nm, and so on, of the second junction 166. In some embodiments, the second switch 162 may be disposed within 20% or less, 10% or less, 5% or less, 2% or less, 1% or less, and so on, of a length of a third interconnection 170 having the second switch 162 and the ground 164 from second junction 166.

Figure 7B:
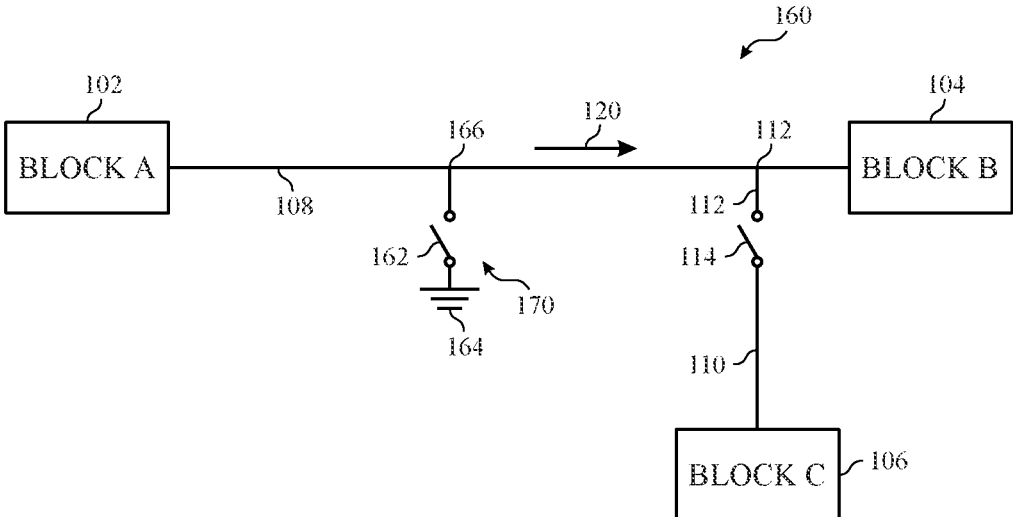
FIG. 7B is a schematic diagram of the RF circuitry of FIG. 7A operating in a first mode to send a high priority signal from the first circuitry to the second circuitry, according to embodiments of the present disclosure.

FIG. 7B is a schematic diagram of the RF circuitry 160 operating in a first mode to send a high priority signal 120 from the first circuitry 102 to the second circuitry 104, according to embodiments of the present disclosure. As illustrated, in the first mode of operation, the processor 12 may deactivate or turn off the first switch 114 and the second switch 162. In this manner, the high priority signal 120 may travel from the first circuitry 102 to the second circuitry 104 over the first interconnection 108 with reduced or minimized power loss due to a lack of switching circuitry being disposed on the first interconnection 108. Additionally, because the first switch 114 is deactivated and disposed near the first junction 112, it provides a high impedance at the first switch 114 near the first junction 112, reducing or minimizing a path on the second interconnection 110 for the high priority signal 120 to travel, blocking or preventing the high priority signal 120 from reaching the third circuitry 106. Similarly, because the second switch 162 is deactivated and disposed near the second junction 166, it provides a high impedance at the second switch 162 near the second junction 166, reducing or minimizing a path on the third interconnection 170 for the high priority signal 120 to travel, blocking or preventing the high priority signal 120 from reaching the ground 164.

Figure 7C:
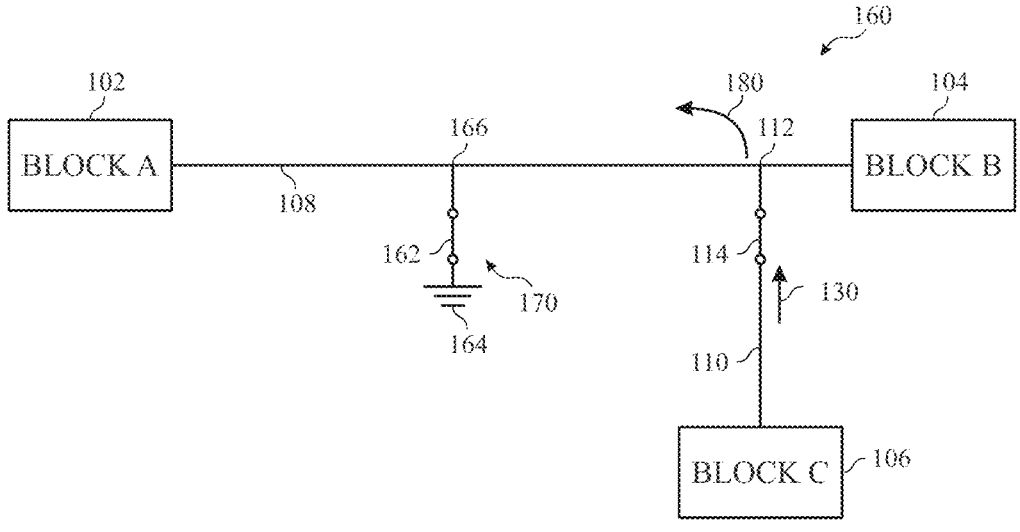
FIG. 7C is a schematic diagram of the RF circuitry of FIG. 7A operating in a second mode to send a low priority signal from the third circuitry to the second circuitry, according to embodiments of the present disclosure.

FIG. 7C is a schematic diagram of the RF circuitry 160 operating in a second mode to send a low priority signal 130 from the third circuitry 106 to the second circuitry 104, according to embodiments of the present disclosure. As illustrated, in the second mode of operation, the processor 12 may activate or turn on the first switch 114 and the second switch 162. In this manner, the low priority signal 130 may travel from the third circuitry 106 to the second circuitry 104 over the second interconnection 110 and the first interconnection 108. Additionally, the second switch 162 and the ground 164 may provide low impedance at the second junction 166 a quarter lambda length 168 away from the first junction 112, resulting in providing high impedance 180 at the first junction 112, thus at least partially blocking the low priority signal 130 from travelling to the first circuitry 102 and/or the ground 164.

Figure 8:
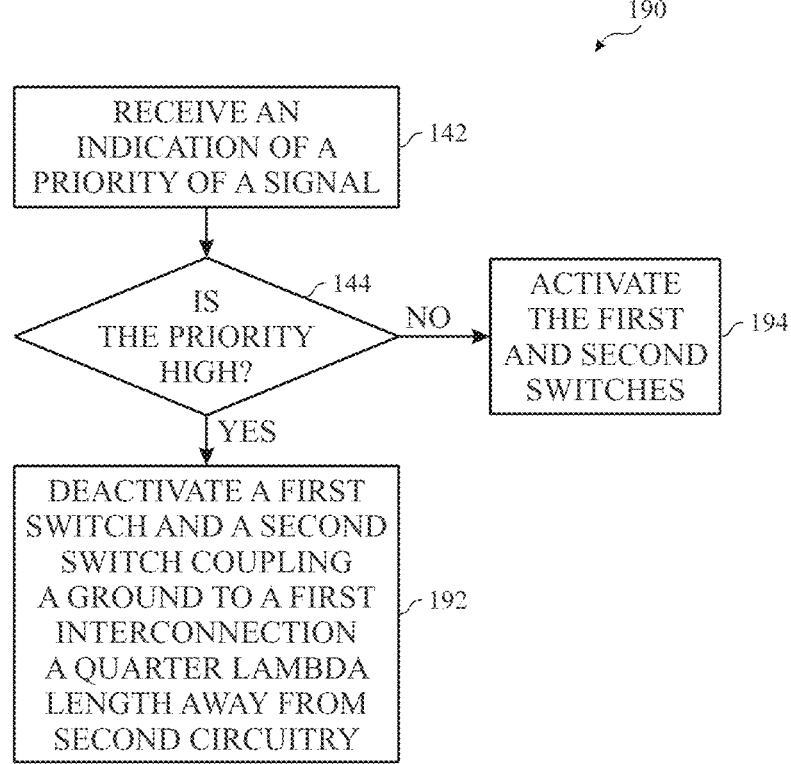
FIG. 8 is a flowchart of a method for operating the RF circuitry of FIG. 7A to send high priority signals and low priority signals to the second circuitry, according to embodiments of the present disclosure.

FIG. 8 is a flowchart of a method 190 for operating the RF circuitry 160 to send high priority signals (e.g., 120) and low priority signals (e.g., 130) to the second circuitry 104, according to embodiments of the present disclosure. Any suitable device (e.g., a controller) that may control components of the electronic device 10, such as the processor 12, may perform the method 190. In some embodiments, the method 190 may be implemented by executing instructions stored in a tangible, non-transitory, computer-readable medium, such as the memory 14 or storage 16, using the processor 12. For example, the method 190 may be performed at least in part by one or more software components, such as an operating system of the electronic device 10, one or more software applications of the electronic device 10, and the like. While the method 190 is described using steps in a specific sequence, it should be understood that the present disclosure contemplates that the described steps may be performed in different sequences than the sequence illustrated, and certain described steps may be skipped or not performed altogether.

In process block 142, the processor 12 receives an indication of a priority of a signal. In process block 144, the processor 12 determines whether the priority is associated with a high priority. In some embodiments, the processor 12 may determine whether the signal frequency is within a frequency range (e.g., frequency band) associated with high priority. If the processor 12 determines that the signal frequency is associated with the high priority, then in process block 192, the processor 12 deactivates the first switch 114 to uncouple the third circuitry 106 from the first interconnection 108 and the second switch 162 to uncouple the ground 164 from the first interconnection 108. This may provide a lossless path (e.g., via the first interconnection 108 without a switch) for the high priority signal to travel from the first circuitry 102 to the third circuitry 106, with the high impedance of the deactivated first switch 114 preventing the high priority signal from traveling to the third circuitry 106 and the high impedance of the deactivated second switch 162 preventing the high priority signal from traveling to the ground 164. On the other hand, if the processor 12 determines that the signal frequency is not associated with the high priority, then in process block 194, the processor 12 activates the first switch 114 to couple the third circuitry 106 to the first interconnection 108 and activates the second switch 162 to couple the ground 164 to the first interconnection 108. This may provide a path (via the second interconnection 110 and the first interconnection 108) for the low priority signal to travel from the third circuitry 106 to the second circuitry 104 while the second switch 162 and the ground 164 provide the high impedance 180 at the first junction 112 (e.g., by providing low impedance at the second junction 166 a quarter lambda length 168 away from the first junction 112) to at least partially blocking the low priority signal from travelling to the first circuitry 102 and/or the ground 164. In this manner, the method 190 enables the processor 12 to operate the RF circuitry 160 to send high priority signals (e.g., 120) and low priority signals (e.g., 130) to the second circuitry 104.

It should be noted that performance of the high impedance blocking by the second switch 162 and the ground 164 may be dependent upon frequency of the low priority signal 130, as the quarter lambda length 168 is a quotient of a speed of a wave of a signal (e.g., a low priority signal) traveling in the first interconnection 108 (e.g., speed of light) divided by a frequency of the signal. That is, if a range of frequency of the low priority signal 130 generated or sent by the third circuitry 106 is large (e.g., the low priority signal 130 has a wide bandwidth or may be included over different frequency bands over time), then the equation expressing the quarter lambda length 168 in terms of frequency may not be met, and the low priority signal 130 may not be effectively blocked, which may result in degradation of the low priority signal 130.

Figure 9A:
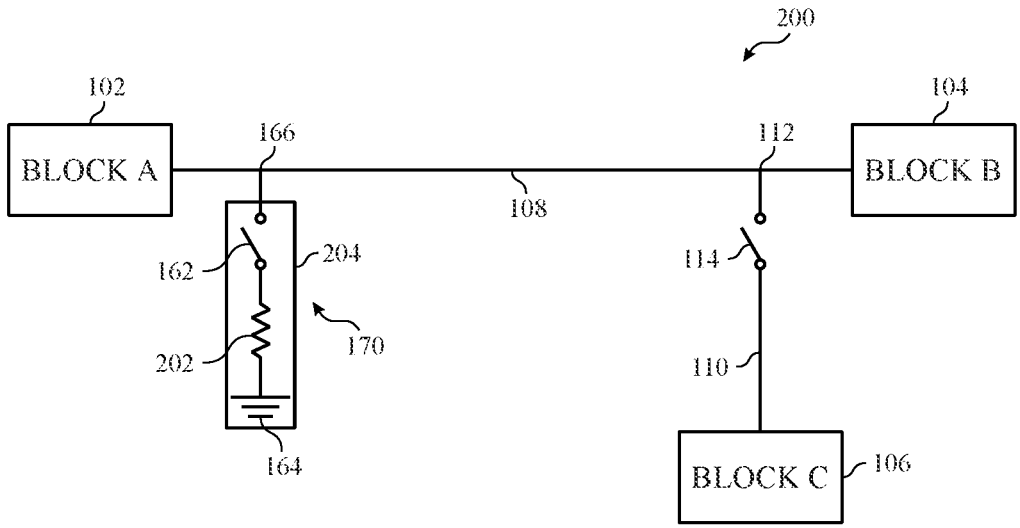
FIG. 9A is a schematic diagram of RF circuitry of the electronic device of FIG. 1 having the first circuitry, the second circuitry, the third circuitry, the first interconnection coupling the first circuitry and the second circuitry, the second interconnection coupling the third circuitry and the first interconnection at a first junction, wherein the first junction is located near the second circuitry, and a second switch coupled to a resistance, a ground, and the first interconnection, according to embodiments of the present disclosure.

FIG. 9A is a schematic diagram of RF circuitry 200 of the electronic device 10 having the first circuitry 102, the second circuitry 104, the third circuitry 106, the first interconnection 108 coupling the first circuitry 102 and the second circuitry 104, the second interconnection 110 coupling the third circuitry 106 and the first interconnection 108 at the first junction 112, wherein the first junction 112 is located near the second circuitry 104, and a second switch 162 coupled to a resistance 202, a ground 164, and the first interconnection 108 at a second junction 166, according to embodiments of the present disclosure. There may be no limitation or requirement for a distance between the second junction 166 and the first junction 112, and, more significantly, the distance is not dependent on a frequency of a signal (e.g., a low priority signal) traveling the first interconnection 108. This may enable the second circuitry 104 and the third circuitry 106 to operate with a wider bandwidth, and enable the low priority signal sent from the third circuitry 106 to have a wider bandwidth, than, for example, the RF circuitry 160 of FIG. 7A.

As with the RF circuitry 160 of FIG. 7A, the second switch 162 may be disposed near the second junction 166. Moreover, the second junction 166 may be disposed near the first circuitry 102. For example, the second junction 166 may be located within a threshold distance to the first circuitry 102, such as within one or more cm, within one or more mm, within one or more um, within one or more nm, and so on, of the second junction 166. In some embodiments, the second junction 166 may be disposed on the first interconnection 108 within 20% or less, 10% or less, 5% or less, 2% or less, 1% or less, and so on, of a length of a first interconnection 108 from first circuitry 102. The second switch 162 and the resistance 202 (e.g., one or more resistive elements, such as a resistor) may have a combined resistance, referred to as a termination resistance 204, equal or approximately equal to a characteristic impedance of the first interconnection 108. In some embodiments, the termination resistance 204 may include a combined resistance of that of the second switch 162, the resistance 202, and any parasitic resistance associated with the termination resistance 204. For example, the termination resistance 204 may include 20 ohms or less, 30 ohms or less, 50 ohms or less, 70 ohms or less, 100 ohms or less, 200 ohms or less, 500 ohms or less, 500 ohms or more, and so on, such as 50 ohms. Because the termination resistance 204 does not change with frequency, the second circuitry 104 and the third circuitry 106 may to operate with a wider bandwidth, and enable the low priority signal sent from the third circuitry 106 to have a wider bandwidth compared to, for example, the RF circuitry 160 of FIG. 7A. Accordingly, the third circuitry 106 may include multiple functional blocks (e.g., circuitry and/ or components) operating at different frequencies and/or different frequency bands. The resistance 202 may include any suitable resistive element that, in combination with the second switch 162, provides a resistance equal or approximately equal to the characteristic impedance of the first interconnection 108. For example, the resistance 202 may include a metal resistor.

Figure 9B:
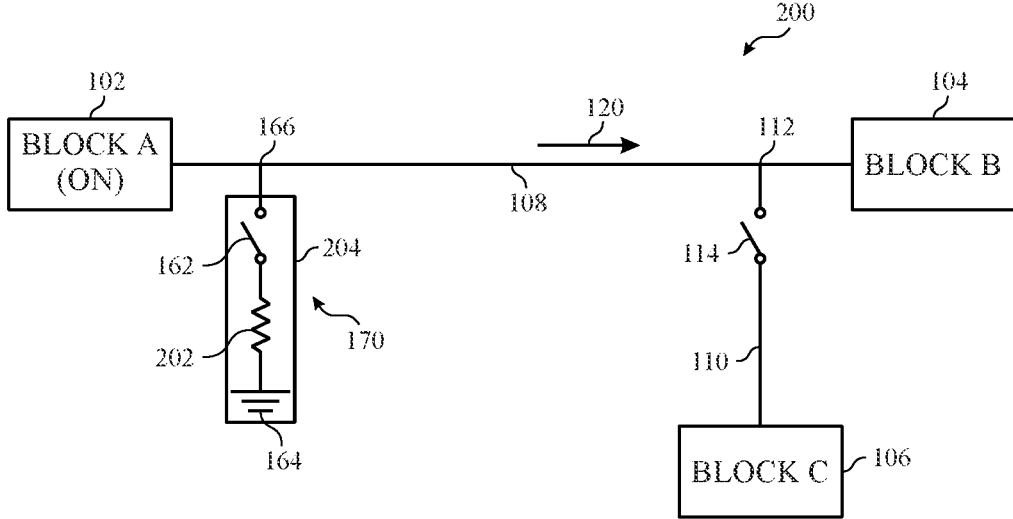
FIG. 9B is a schematic diagram of the RF circuitry of FIG. 9A operating in a first mode to send a high priority signal from the first circuitry to the second circuitry, according to embodiments of the present disclosure.

FIG. 9B is a schematic diagram of the RF circuitry 200 operating in a first mode to send a high priority signal 120 from the first circuitry 102 to the second circuitry 104, according to embodiments of the present disclosure. As illustrated, in the first mode of operation, the processor 12 may deactivate or turn off the first switch 114 and the second switch 162. The processor 12 may also activate or turn on the first circuitry 102 to enable the first circuitry 102 to send the high priority signal 120. In this manner, the high priority signal 120 may travel from the first circuitry 102 to the second circuitry 104 over the first interconnection 108 with reduced or minimized power loss due to a lack of switching circuitry being disposed on the first interconnection 108. Additionally, because the first switch 114 is deactivated and disposed near the first junction 112, it provides a high impedance at the first switch 114 near the first junction 112, reducing or minimizing a path on the second interconnection 110 for the high priority signal 120 to travel, blocking or preventing the high priority signal 120 from reaching the third circuitry 106. Similarly, because the second switch 162 is deactivated and disposed near the second junction 166, it provides a high impedance at the second switch 162 near the second junction 166, reducing or minimizing a path on a third interconnection 170 having the second switch 162, the resistance 202, and the ground 164 for the high priority signal 120 to travel, blocking or preventing the high priority signal 120 from reaching the resistance 202 and the ground 164.

Figure 9C:
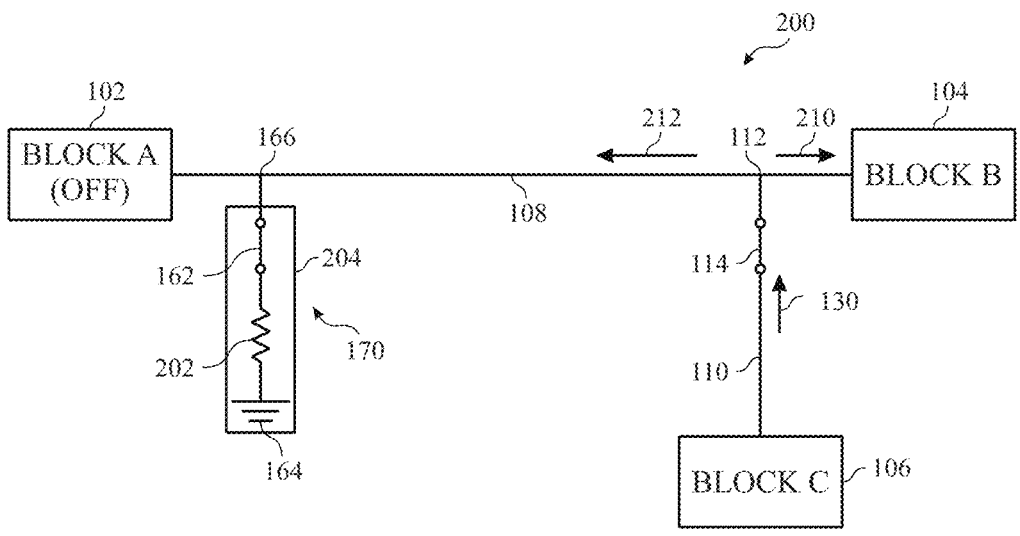
FIG. 9C is a schematic diagram of the RF circuitry of FIG. 9A operating in a second mode to send a low priority signal from the third circuitry to the second circuitry, according to embodiments of the present disclosure.

FIG. 9C is a schematic diagram of the RF circuitry 200 operating in the second mode to send a low priority signal 130 from the third circuitry 106 to the second circuitry 104, according to embodiments of the present disclosure. As illustrated, in the second mode of operation, the processor 12 may activate or turn on the first switch 114 and the second switch 162. The processor 12 may also deactivate or turn off the first circuitry 102, causing the first circuitry 102 to provide a high impedance. Accordingly, the low priority signal 130 may split at the first junction 112 into a first portion 210 traveling toward and received by the second circuitry 104 and a second portion 212 traveling toward the first circuitry 102. Instead of reflecting back toward the second circuitry 104 as a result from encountering the first circuitry 102, because the second switch 162 is activated, the second portion 212 of the low priority signal 130 may be absorbed by the termination resistance 204, thus reducing or minimizing any reflection of the low priority signal 130 to be received at the second circuitry 104. In some cases, the second portion 212 of the low priority signal 130 may result in a reduced or minimal power loss (e.g., of 3 decibels (dB) or less) to the signal 130, as evidenced in the first portion 210 of the low priority signal 130. In this manner, the low priority signal 130 may travel from the third circuitry 106 to the second circuitry 104 over the second interconnection 110 and the first interconnection 108.

Figure 10:
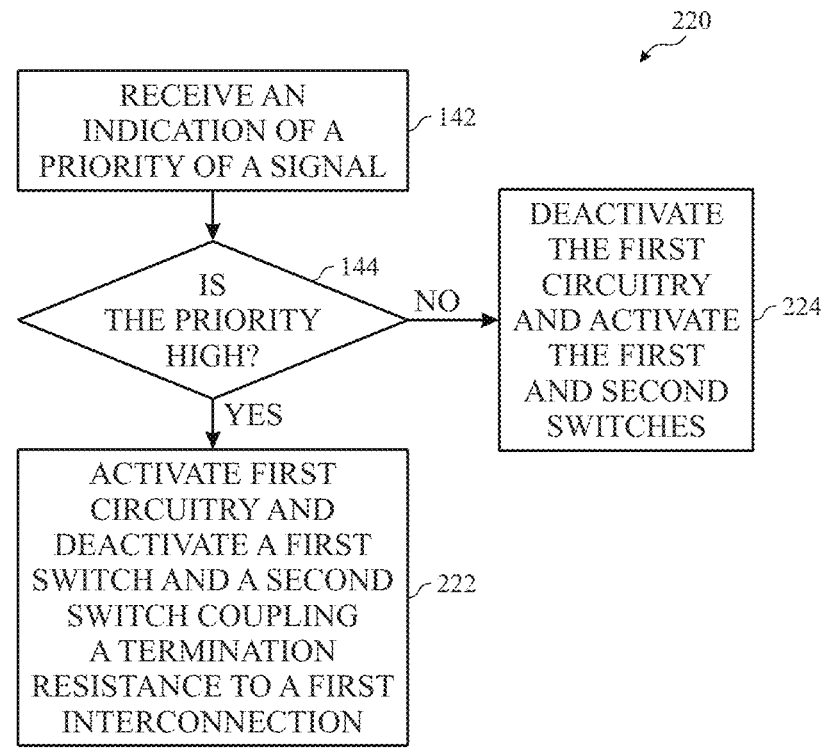
FIG. 10 is a flowchart of a method for operating the RF circuitry of FIG. 9A to send high priority signals and low priority signals to the second circuitry, according to embodiments of the present disclosure.

FIG. 10 is a flowchart of a method 220 for operating the RF circuitry 200 to send high priority signals (e.g., 120) and low priority signals (e.g., 130) to the second circuitry 104, according to embodiments of the present disclosure. Any suitable device (e.g., a controller) that may control components of the electronic device 10, such as the processor 12, may perform the method 220. In some embodiments, the method 220 may be implemented by executing instructions stored in a tangible, non-transitory, computer-readable medium, such as the memory 14 or storage 16, using the processor 12. For example, the method 220 may be performed at least in part by one or more software components, such as an operating system of the electronic device 10, one or more software applications of the electronic device 10, and the like. While the method 220 is described using steps in a specific sequence, it should be understood that the present disclosure contemplates that the described steps may be performed in different sequences than the sequence illustrated, and certain described steps may be skipped or not performed altogether.

In process block 142, the processor 12 receives an indication of a priority of a signal. In process block 144, the processor 12 determines whether the priority is a high priority. In some embodiments, the processor 12 may determine whether the signal frequency is within a frequency range (e.g., frequency band) associated with high priority. If the processor 12 determines that the signal frequency is associated with the high priority, then in process block 222, the processor 12 activates the first circuitry 102, deactivates the first switch 114 to uncouple the third circuitry 106 from the first interconnection 108, and deactivates the second switch 162 to uncouple the termination resistance 204 from the first interconnection 108. This may provide a path with reduced or minimized loss (e.g., via the first interconnection 108 without a switch) for the high priority signal to travel from the first circuitry 102 to the third circuitry 106, with the high impedance of the deactivated first switch 114 preventing the high priority signal from traveling to the third circuitry 106 and the high impedance of the deactivated second switch 162 preventing the high priority signal from traveling to the termination resistance 204. On the other hand, if the processor 12 determines that the signal frequency is not associated with the high priority, then in process block 224, the processor 12 deactivates the first circuitry 102, activates the first switch 114 to couple the third circuitry 106 to the first interconnection 108, and activates the second switch 162 to couple the termination resistance 204 to the first interconnection 108. This may provide a path (via the second interconnection 110 and the first interconnection 108) for a first portion (e.g., 210) of the low priority signal split from the first junction 112 to travel from the third circuitry 106 to the second circuitry 104 while the second switch 162 and the termination resistance 204 absorb a second portion (e.g., 212) of the low priority signal split from the first junction 112 to reduce, minimize, or prevent reflection of the second portion of the low priority signal from reaching the second circuitry 104. In this manner, the method 220 enables the processor 12 to operate the RF circuitry 160 to send high priority signals (e.g., 120) and low priority signals (e.g., 130) to the second circuitry 104.

Figure 11:
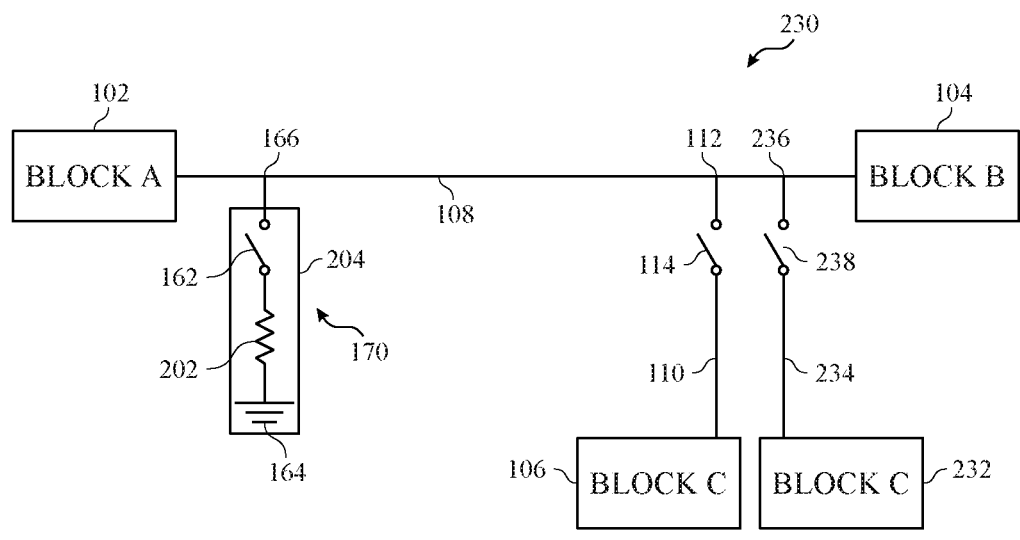
FIG. 11 is a schematic diagram of RF circuitry of the electronic device of FIG. 1 having the first circuitry, the second circuitry, the third circuitry, a fourth circuitry, the first interconnection coupling the first circuitry and the second circuitry, the second interconnection coupling the third circuitry and the first interconnection at the first junction, the third interconnection having the second switch coupled to the resistance, the ground, and the first interconnection at a second junction, and a fourth interconnection coupling the fourth circuitry and the first interconnection at a third junction, wherein the first junction and the third junction located near the second circuitry, according to embodiments of the present disclosure.

While the embodiments described above include coupling three circuitries (e.g., 102, 104, 106) or functional blocks together via two interconnections (e.g., 108, 110), it should be understood that they may be applied to any suitable number of circuitries or functional blocks (e.g., more than three circuitries or functional blocks, more than five circuitries or functional blocks, more than ten circuitries or functional blocks, and so on). FIG. 11 is a schematic diagram of RF circuitry 230 having the first circuitry 102, the second circuitry 104, the third circuitry 106, a fourth circuitry 232, the first interconnection 108 coupling the first circuitry 102 and the second circuitry 104, the second interconnection 110 coupling the third circuitry 106 and the first interconnection 108 at the first junction 112, the third interconnection 170 having the second switch 162 coupled to the resistance 202, the ground 164, and the first interconnection 108 at a second junction 166, and a fourth interconnection 234 coupling the fourth circuitry 232 and the first interconnection 108 at a third junction 236, wherein the first junction 112 and the third junction 236 located near the second circuitry 104, according to embodiments of the present disclosure.

As with the second interconnection 110, the fourth interconnection 234 may include a third switch 238 that may be disposed near the third junction 236. For example, the third switch 238 may be located within a threshold distance to the third junction 236, such as within one or more cm, within one or more mm, within one or more um, within one or more nm, and so on, of the third junction 236. In some embodiments, the second switch 162 may be disposed within 20% or less, 10% or less, 5% or less, 2% or less, 1% or less, and so on, of a length of the fourth interconnection 234 from the third junction 236. This may reduce or minimize a path on the fourth interconnection 234 for a high priority signal sent from the first circuitry 102 to travel down the fourth interconnection 234 when the third switch 238 is deactivated or open, providing a high impedance.

Moreover, as with the second junction 166, the third junction 236 may be disposed near the second circuitry 104. For example, the third junction 236 may be located within a threshold distance to the second circuitry 104, such as within one or more cm, within one or more mm, within one or more um, within one or more nm, and so on, of the second circuitry 104. In some embodiments, the third junction 236 may be disposed within 20% or less, 10% or less, 5% or less, 2% or less, 1% or less, and so on, of a length of the fourth interconnection 234 from the second circuitry 104.

Similar to the RF circuitry 200 of FIG. 9A, when the first circuitry 102 is operating in a first mode to send a high priority signal (e.g., 120) from the first circuitry 102 to the second circuitry 104, the processor 12 may deactivate or turn off the first switch 114, the second switch 162, and the third switch 238. The processor 12 may also activate or turn on the first circuitry 102 to enable the first circuitry 102 to send the high priority signal 120. In this manner, the high priority signal 120 may travel from the first circuitry 102 to the second circuitry 104 over the first interconnection 108 with reduced or minimized power loss due to a lack of switching circuitry being disposed on the first interconnection 108. Additionally, because the first switch 114 and the third switch 238 are deactivated and disposed near the first junction 112 and the third junction 236, respectively, the switches 114, 238 provide high impedances at the first switch 114 and the third switch 238 near the first junction 112 and the third junction 236, respectively, reducing or minimizing a path on the second interconnection 110 or the fourth interconnection 234 for the high priority signal 120 to travel, blocking or preventing the high priority signal 120 from reaching the third circuitry 106 or the fourth circuitry 232. Similarly, because the second switch 162 is deactivated and disposed near the second junction 166, it provides a high impedance at the second switch 162 near the second junction 166, reducing or minimizing a path on a third interconnection 170 having the second switch 162, the resistance 202, and the ground 164 for the high priority signal to travel, blocking or preventing the high priority signal 120 from reaching the resistance 202 and the ground 164.

When operating in the second mode to send a low priority signal (e.g., 130) from the third circuitry 106 to the second circuitry 104, the processor 12 may activate or turn on the first switch 114 and the second switch 162. The processor 12 may also deactivate or turn off the first circuitry 102 and deactivate or turn off the third switch 238, causing the first circuitry 102 and the third switch 238 to provide high impedances. Accordingly, the low priority signal 130 may split at the first junction 112 into a first portion (e.g., 210) traveling toward and received by the second circuitry 104 and a second portion (e.g., 212) traveling toward the first circuitry 102. Instead of reflecting back toward the second circuitry 104 as a result from encountering the first circuitry 102, because the second switch 162 is activated, the second portion 212 of the low priority signal 130 may be absorbed by the termination resistance 204, thus reducing or minimizing any reflection of the low priority signal 130 to be received at the second circuitry 104. In this manner, the low priority signal 130 may travel from the third circuitry 106 to the second circuitry 104 over the second interconnection 110 and the first interconnection 108.

When operating in a third mode to send a second low priority signal from the fourth circuitry 232 to the second circuitry 104, the processor 12 may activate or turn on the third switch 238 and the second switch 162. The processor 12 may also deactivate or turn off the first circuitry 102 and deactivate or turn off the first switch 114, causing the first circuitry 102 and the first switch 114 to provide high impedances. Accordingly, the second low priority signal may split at the first junction 112 into a first portion traveling toward and received by the second circuitry 104 and a second portion traveling toward the first circuitry 102. Instead of reflecting back toward the second circuitry 104 as a result from encountering the first circuitry 102, because the second switch 162 is activated, the second portion of the second low priority signal may be absorbed by the termination resistance 204, thus reducing or minimizing any reflection of the second low priority signal to be received at the second circuitry 104. In this manner, the second low priority signal may travel from the fourth circuitry 232 to the second circuitry 104 over the fourth interconnection 234 and the first interconnection 108. Moreover, the third circuitry 106 and the fourth circuitry 232 may operate at different frequencies or provide a wide bandwidth of operating frequencies (thus sending signals of different and varying frequencies over the second and fourth interconnections 110, 234), due to not being sensitive to or dependent on frequency of a signal sent. It should be understood that any number of additional circuitries may be added, similar to the third and fourth circuitries 106, 232, on respective interconnections (e.g., 110, 234) having respective switches (114, 238), and, when in operation, the processor 12 may activate the respective switch and the second switch 162 of the termination resistance 204 while deactivating all other non-operating path switches, as described above with respect to the third and fourth circuitries 106, 232.

Figure 12:
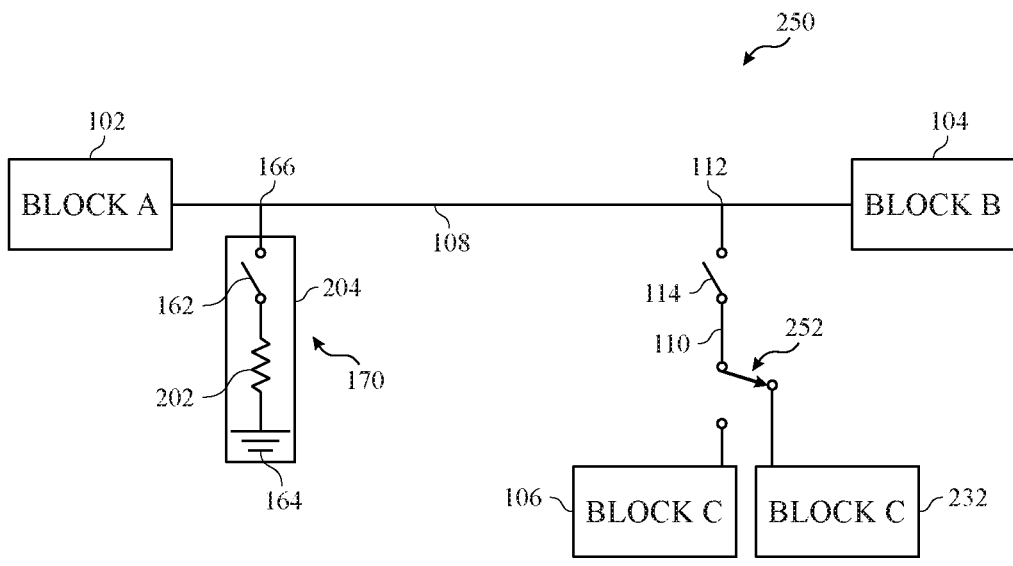
FIG. 12 is a schematic diagram of RF circuitry of the electronic device of FIG. 1 having the first circuitry, the second circuitry, the third circuitry, a fourth circuitry, the first interconnection coupling the first circuitry and the second circuitry, the second interconnection coupling a third switch and the first interconnection at the first junction, the third interconnection having the second switch coupled to the resistance, the ground, and the first interconnection, and the third switch coupling the third circuitry and the fourth circuitry to the second interconnection, according to embodiments of the present disclosure.

FIG. 12 is a schematic diagram of RF circuitry 250 having the first circuitry 102, the second circuitry 104, the third circuitry 106, a fourth circuitry 232, the first interconnection 108 coupling the first circuitry 102 and the second circuitry 104, the second interconnection 110 coupling a third switch 252 and the first interconnection 108 at the first junction 112, the third interconnection 170 having the second switch 162 coupled to the resistance 202, the ground 164, and the first interconnection 108 at a second junction 166, and the third switch 252 coupling the third circuitry 106 and the fourth circuitry 232 to the second interconnection 110, according to embodiments of the present disclosure.

In some embodiments, the third switch 252 may be a multi-way switch, illustrated as a two-way switch due to coupling to two circuitries 106, 232. The RF circuitry 250 may operate similarly to the RF circuitry 200 of FIG. 9A, except when operating in the second mode of operation when a low priority signal (e.g., 130) is sent from the third circuitry 106 to the second circuitry 104 or a third mode of operation when a second low priority signal is sent from the fourth circuitry 232 to the second circuitry 104, the processor 12 may operate the third switch 252 to couple to the source circuitry (e.g., a source of sending a signal to the second circuitry 104, the third circuitry 106 for the second mode of operation or the fourth circuitry 232 for the third mode of operation). As with the RF circuitry 230 of FIG. 11, it should be understood that any number of additional circuitries may be added, in this case, by coupling the additional circuitry or circuitries to the multi-way switch 252, and operating the third switch 252 to couple to the source circuitry.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. Radio frequency circuitry comprising:
   first circuitry;
   second circuitry;
   a first interconnection coupling the first circuitry to the second circuitry, wherein the first interconnection is continuous and coupled to a ground via a first switch;
   third circuitry; and
   a second interconnection coupling the third circuitry to the first interconnection via a second switch, the third circuitry being configured to transmit a signal to the second circuitry via the second interconnection.

2. The radio frequency circuitry of claim 1, wherein the first circuitry, the second circuitry, or the third circuitry comprises an amplifier, a digital-to-analog converter, an analog-to-digital converter, a filter, a mixer, a digital up converter, a digital down converter, a modulator, or a demodulator.

3. The radio frequency circuitry of claim 1, wherein the first circuitry is configured to transmit an additional signal to the second circuitry via the first interconnection.

4. The radio frequency circuitry of claim 1, wherein the second interconnection is coupled to the first interconnection at a junction, the junction being within 5% of a length of the first interconnection from the second circuitry.

5. The radio frequency circuitry of claim 1, wherein a resistive element is coupled to the first switch that is coupled to the first interconnection.

6. The radio frequency circuitry of claim 5, wherein a combined resistance of the first switch and the resistive element equals a characteristic impedance of the first interconnection.

7. The radio frequency circuitry of claim 5, wherein the first switch is coupled to the first interconnection at a junction, the junction being within 5% of a length of the first interconnection from the first circuitry.

8. Tangible, non-transitory, computer-readable media storing instructions that cause processing circuitry to:
   receive an indication of a frequency of a signal to be sent from a first circuitry to a second circuitry over a first interconnection or a third circuitry to the second circuitry over a second interconnection and the first interconnection;

deactivate a first switch coupling the third circuitry to the first interconnection and deactivate a second switch coupling a third interconnection to the first interconnection based on the frequency being associated with a priority; and activate the first switch and activate the second switch based on the frequency not being associated with the priority.

9. The tangible, non-transitory, computer-readable of claim 8, wherein a ground is coupled to the second switch on the third interconnection.

10. The tangible, non-transitory, computer-readable media of claim 9, wherein the second interconnection couples to the first interconnection at a first junction, the third interconnection couples to the first interconnection at a second junction, and the second junction is a quarter lambda length away from the first junction based on the frequency.

11. The tangible, non-transitory, computer-readable media of claim 10, wherein the second switch and the ground provide a lower impedance at the second junction and a higher impedance at the first junction.

12. The tangible, non-transitory, computer-readable media of claim 8, wherein the instructions cause the processing circuitry to activate the first circuitry based on the frequency being associated with the priority.

13. The tangible, non-transitory, computer-readable media of claim 8, wherein the instructions cause the processing circuitry to deactivate the first circuitry based on the frequency not being associated with the priority.

14. The tangible, non-transitory, computer-readable media of claim 8, wherein the priority is a high priority.

15. An electronic device comprising:
one or more antenna ports; and
a transceiver coupled to the one or more antenna ports, the transceiver comprising
first circuitry,
second circuitry,
a first interconnection coupling the first circuitry to the second circuitry, wherein the first interconnection is configured to send a first signal of a first frequency from the first circuitry to the second circuitry,
third circuitry, and
a second interconnection coupling the third circuitry to the first interconnection via a first switch, wherein the second interconnection is configured to send a second signal of a second frequency from the third circuitry to the second circuitry.

16. The electronic device of claim 15, wherein the first interconnection does not comprise switching circuitry.

17. The electronic device of claim 15, wherein the first switch is configured to deactivate to send the first signal from the first circuitry to the second circuitry.

18. The electronic device of claim 15, wherein the first circuitry is configured to activate to send the first signal from the first circuitry to the second circuitry.

19. The electronic device of claim 15, wherein the first switch is configured to activate to send the second signal from the third circuitry to the second circuitry.

20. The electronic device of claim 15, wherein the first circuitry is configured to deactivate to send the second signal from the third circuitry to the second circuitry.

* * * * *